J. G. SWAIN.
DEMOUNTABLE RIM CONSTRUCTION.
APPLICATION FILED JAN. 25, 1919.
1,391,806.
Patented Sept. 27, 1921.
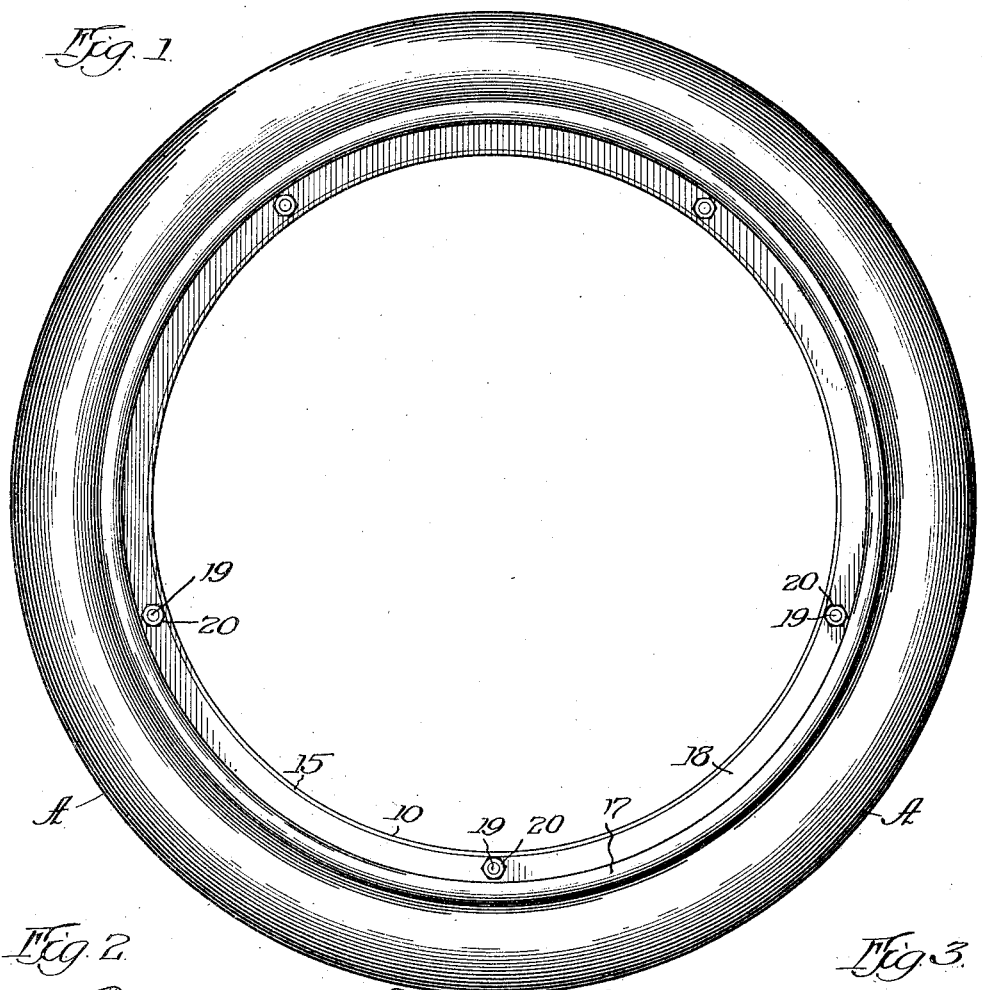
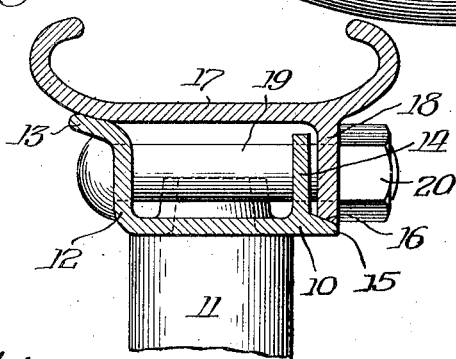
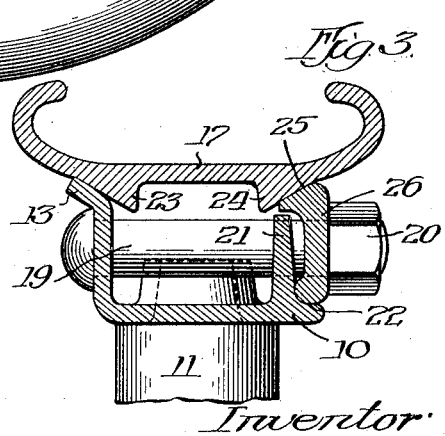
Witness:
Geo. Davison
Inventor
Joseph G. Swain,
By G. L. Ely
Atty

UNITED STATES PATENT OFFICE.

JOSEPH G. SWAIN, OF AKRON, OHIO, ASSIGNOR TO THE FIRESTONE STEEL PRODUCTS COMPANY, OF AKRON, OHIO, A CORPORATION OF OHIO.

DEMOUNTABLE-RIM CONSTRUCTION.

1,391,806. Specification of Letters Patent. Patented Sept. 27, 1921.

Application filed January 25, 1919. Serial No. 273,064.

*To all whom it may concern:*

Be it known that I, JOSEPH G. SWAIN, a citizen of the United States, residing at Akron, in the county of Summit and State of Ohio, have invented certain new and useful Improvements in Demountable-Rim Construction, of which the following is a specification.

It is the object of my invention to design a demountable rim construction which will be adaptable for all types of automobiles, especially for light cars, and will be strong and practical. It is also one of the purposes of the invention to construct the rim mounting with a minimum number of elements, and superior in many respects to other forms of mounting.

Other objects and advantages will appear from the description, it being understood that many details shown and described are capable of change and modification within the scope of the invention.

Figure 1 is a side elevation of the construction embodying my invention.

Fig. 2 is a cross section, and

Fig. 3 is a cross section of a modified form.

In the drawings 10 represents the fixed rim or felly of the wheel which may be formed to receive a plurality of spokes 11, in any preferred manner. One side of the fixed rim is formed with a vertical flange 12, the circumference of which carries a seat 13 which may be formed by bending the flange outwardly at a convenient angle. Opposite the flange 12 and parallel thereto, is formed a second vertical rib or flange 14, and the edge of the fixed rim is formed with a ledge or rib 15, the outer surface of which forms a seat 16, preferably by beveling.

The rim is indicated by the numeral 17 and may be of any preferred type, that shown being a clencher rim. One side of the rim is seated on the surface 13 while the opposite side carries an inwardly extending rib 18 parallel to the arms of the fixed rim, the inside or lower edge of which fits the seat 16.

Across the felly extend a plurality of lateral bolts 19 which pass through apertures in the flanges 12 and 14 and through mating apertures in the rib 18. A nut 20 on the end of the bolt serves to clamp the rim on the seats 13 and 16.

It will be seen that in this form of rim construction, a hollow or U-shaped metallic felly or fixed rim is provided on the wheel and a simple practical rim construction is designed to coöperate with it, involving few parts and easy of manufacture and operation.

In the modification shown in Fig. 3, the felly construction is similar to the preferred form, the rib 21 being slightly tapered and the seat 16 replaced by a seat 22, which may be curved slightly if desired. The rim 17 is provided on its inner surface with a pair of oppositely faced beveled ribs 23 and 24, one of which, 23, rests on the seat 13. The seat 24 rests on the outer edge 25 of a removable clamping ring 26, the inner edge of which conforms to and seats at 22. The bolt and nut 19 and 20 are similarly located as in the preferred form.

It is possible to change the invention in many of the details without departing from the invention or losing any of its benefits.

I claim:

1. A construction for wheels and demountable rims, comprising a fixed rim, two radially extending flanges on said fixed rim, a bearing seat on the outer edge of one of said flanges, a demountable rim, one side of said demountable rim resting on said seat, means for holding the rim on the seat comprising a locking member and a bolt passing through said flanges and said locking member, the inner edge of said locking member bearing against the fixed rim and means on said bolt to force the locking member toward the fixed rim to hold the demountable rim on its seat.

2. A construction for wheels and demountable rims, comprising a fixed rim, two radially extending flanges on said fixed rim, a bearing seat on the outer edge of one of said flanges, a demountable rim, one side of said demountable rim resting on said seat, means for holding the rim on the seat comprising a removable locking member and a bolt passing through said flanges and said locking member, the inner edge of said locking member bearing against the fixed rim and means on said bolt to force the locking member toward the fixed rim to hold the demountable rim on its seat.

3. A construction for wheels and demountable rims comprising a fixed rim, two radially extending flanges on said fixed rim, a bearing seat on the outer edge of one of said flanges, a demountable rim, one side of said demountable rim resting on said seat, and means for holding the rim on the seat comprising a removable locking member and a bolt passing through the said flanges and said locking member, the inner edge of said locking member being fulcrumed on said fixed rim, a wedge surface at the outer edge of said locking member, and means on said bolt to force the locking member and the wedge portion toward the fixed rim.

4. A construction for wheels and demountable rims comprising a U-shaped fixed rim, locking means comprising a bolt passing through the parallel arms of said fixed rim, a seat formed on the lower side of said fixed rim, a demountable rim, one side whereof seats on the outer edge of one of said arms, a locking member parallel with the said arms on the side opposite from said seating side of the demountable rim, the inner edge of said locking member resting on said seat and means associated with the bolt to bear against the locking member.

JOSEPH G. SWAIN.